(12) United States Patent
Roundy et al.

(10) Patent No.: US 7,561,536 B2
(45) Date of Patent: Jul. 14, 2009

(54) METHOD AND APPARATUS FOR SIMULTANEOUS INCOMING DIGITAL CALL PROCESSING USING ISDN BONDING CHANNELS

(75) Inventors: Larry Roundy, Austin, TX (US); Guruprasad Subbarao, Austin, TX (US); David N. Hein, Pflugerville, TX (US)

(73) Assignee: Polycom, Inc., Pleasanton, CA (US)

( * ) Notice: Subject to any disclaimer, the term of this patent is extended or adjusted under 35 U.S.C. 154(b) by 960 days.

(21) Appl. No.: 10/694,622

(22) Filed: Oct. 27, 2003

(65) Prior Publication Data

US 2004/0114031 A1    Jun. 17, 2004

Related U.S. Application Data

(60) Provisional application No. 60/421,266, filed on Oct. 25, 2002.

(51) Int. Cl.
*H04L 12/16* (2006.01)
*H04Q 11/00* (2006.01)

(52) U.S. Cl. .................. 370/261; 370/264; 370/454; 370/524; 348/14.08; 348/14.09

(58) Field of Classification Search ............ 370/352, 370/465, 261, 264, 454, 524; 348/14.08, 348/14.09
See application file for complete search history.

(56) References Cited

U.S. PATENT DOCUMENTS 5,197,062 A * 3/1993 Picklesimer ............... 370/508
5,757,781 A * 5/1998 Gilman et al. ............. 370/260
6,175,575 B1 * 1/2001 Ahuja et al. ............... 370/524
6,219,840 B1 * 4/2001 Corrigan et al. ........... 725/117

FOREIGN PATENT DOCUMENTS

JP         409200319 A  *  7/1997

* cited by examiner

*Primary Examiner*—Quynh H Nguyen
(74) *Attorney, Agent, or Firm*—Wong, Cabello, Lutsch, Rutherford, & Brucceleri, L.L.P.

(57) ABSTRACT

Assigning inbound ringing ISDN channels to a particular endpoint's call uses a framing listening technique to distinguish between H.221 framing, master bonding channel framing and slave bonding channel framing. If the channel is receiving Master Bonding Channel framing, the MCU detects that this is a new call from a unique far endpoint and may then begin a process to address this new call. If the channel is receiving Slave Bonding Channel framing, the MCU then transmits a multi-frame pattern and looks for a Physical Video Unit Identifier the MCU sent to this far end via the Master Channel upon initial negotiation. If the channel is receiving H.221 framing, a H.243 terminal address assigned using a Terminal Indicate Assignment (TIA) message in the initial channel is used. The far endpoint may then send this address in its additional channels through the use of a Terminal Indicate Additional Channel X (TIX) message. The MCU may associate an incoming channel to the correct call by examining the address sent by the far endpoint in the TIX message. In the case of simultaneous calls according to the H.323 protocol, the process retains the incoming H.323 call in the current state (i.e., Alerting/Incoming Ringing State), and waits until the current call progresses to a state Call Connected, after which the incoming call may be allowed to be answered and transitioned to its Call Connected state. This may be done without hanging up the incoming call with a busy indication.

14 Claims, 2 Drawing Sheets

METHOD AND APPARATUS FOR SIMULTANEOUS INCOMING DIGITAL CALL PROCESSING USING ISDN BONDING CHANNELS

CROSS-REFERENCE TO RELATED APPLICATIONS

This application claims the benefit of U.S. provisional patent application Ser. No. 60/421,266 filed Oct. 25, 2002 by applicants Larry Roundy, Guruprasad Subbarao and David N. Hein.

BACKGROUND OF THE INVENTION

1. Field of the Invention

This invention relates to videoconferencing. More particularly, it relates to a method used to sort out and assign inbound dialed Integrated Services Digital Network (ISDN) video calls, H.221 inbound dialed calls, and H.323 inbound Internet Protocol video calls from different physical videoconferencing units where the calls arrive at the local endpoint at the same time or nearly the same time. The methods disclosed herein apply to initial calls as well as to expanded (i.e., up speeding) calls.

2. Description of the Related Art

A method to process simultaneous incoming digital calls was developed to enhance the ease of use for the user and/or enhance the total user experience in the videoconferencing environment. Videoconferencing endpoints with internal Multipoint Control Unit (MCU) capabilities of the prior art do not address this issue. The common handling of two simultaneous or nearly simultaneous incoming calls is to hang up the second call and sometimes hang up both calls. This causes frustration to the user who then has to call back. It is possible that the two users may call back within a short enough time interval to have the same result happen to them yet again. Some methods of the prior art only accommodate one inbound call and the rest must be made as outgoing calls from the MCU. Ideally, if a conference is scheduled at e.g., 10:00 a.m. and all remote participants are instructed to dial in (i.e., the remote participant endpoints are paying the telecommunications charges), and if they all happen to call at the same time, all of the calls should connect. The remote participants should not have to try and figure out why their calls failed or receive busy signals when they were instructed to call in at 10:00 a.m.

SUMMARY OF THE INVENTION

One preferred method used to sort out and assign inbound ringing ISDN channels to a particular endpoint's call uses a framing listening technique. This refers to the method used to determine the type of frame that is transmitted by the far side. This may be used to distinguish between H.221 framing, master bonding channel framing and slave bonding channel framing. The local MCU reacts to an inbound dialed ISDN call by answering/accepting the call on the channel and may then begin to listen to what type of framing is being transmitted from the far (i.e., calling or remote) side. The framing may be one of four types: 1) Master Bonding Channel framing wherein the master channel initially sends the bonding information channel (IC) consisting of a 16-byte frame, with a unique alignment pattern in the first byte; 2) Slave Bonding Channel framing, wherein Slave channels send bonding frames consisting of 256 bytes, where the 64th byte is a unique frame alignment word (FAW); 3) H.221 framing; or, 4) some unknown framing type, perhaps a different bonding mode. The bonding standard describes four modes of operation—modes 0, 1, 2 and 3. Mode 1 is typically used for video conferencing.

The local MCU may then process the newly connected channel based on what it is receiving. If the channel listened on is receiving Master Bonding Channel framing, the MCU detects that this is a new call from a unique far endpoint and may then begin a process to address this new call. If the channel listened on is receiving Slave Bonding Channel framing, the MCU then transmits a multi-frame pattern and looks for a Physical Video Unit Identifier the MCU sent to this far end via the Master Channel upon initial negotiation. The Physical Video Unit Identifier may be a field contained within the multi-frame, which may be reserved for the answering endpoint to transmit a value to the far end point upon Master Channel negotiation and must be transmitted back to the answering endpoint when calling in on Slave channels. If the channel listened on is receiving H.221 framing, then a process may be started to address a NX56/64K non-bonded call. A non-bonded call uses some other method for channel aggregation, such as H.221 channel aggregation. If none of the previous three frame types are found, the MCU may invoke an error process to properly dispose of the call.

In the case of simultaneous calls according to the H.323 protocol and mixed H.323 and H.320 calls, the process retains the incoming H.323 call in the current state (i.e., Alerting/Incoming Ringing State), and waits until the current call (H.323 or H.320) progresses to a state Call Connected, after which the incoming call may be allowed to be answered and transitioned to its Call Connected state. This may be done without hanging up the incoming call with a busy indication.

In the case of simultaneous calls according to the H.221 protocol, one embodiment of the invention makes use of a H.243 terminal address. H.243 describes how a multipoint controller (MCU) assigns a terminal address to an endpoint using a Terminal Indicate Assignment (TIA) message in the initial channel. The far endpoint may then send this address in its additional channels through the use of a Terminal Indicate Additional Channel X (TIX) message. The MCU may associate an incoming channel to the correct call by examining the address sent by the far endpoint in the TIX message.

DETAILED DESCRIPTION

Simultaneous Incoming ISDN Calls

As used herein, there are two types of "calls." A standard call is defined as one addressing a single channel; a Video Call is all of the calls across all of the channels each Physical Video Unit requires to make its total bandwidth.

Figure 1:
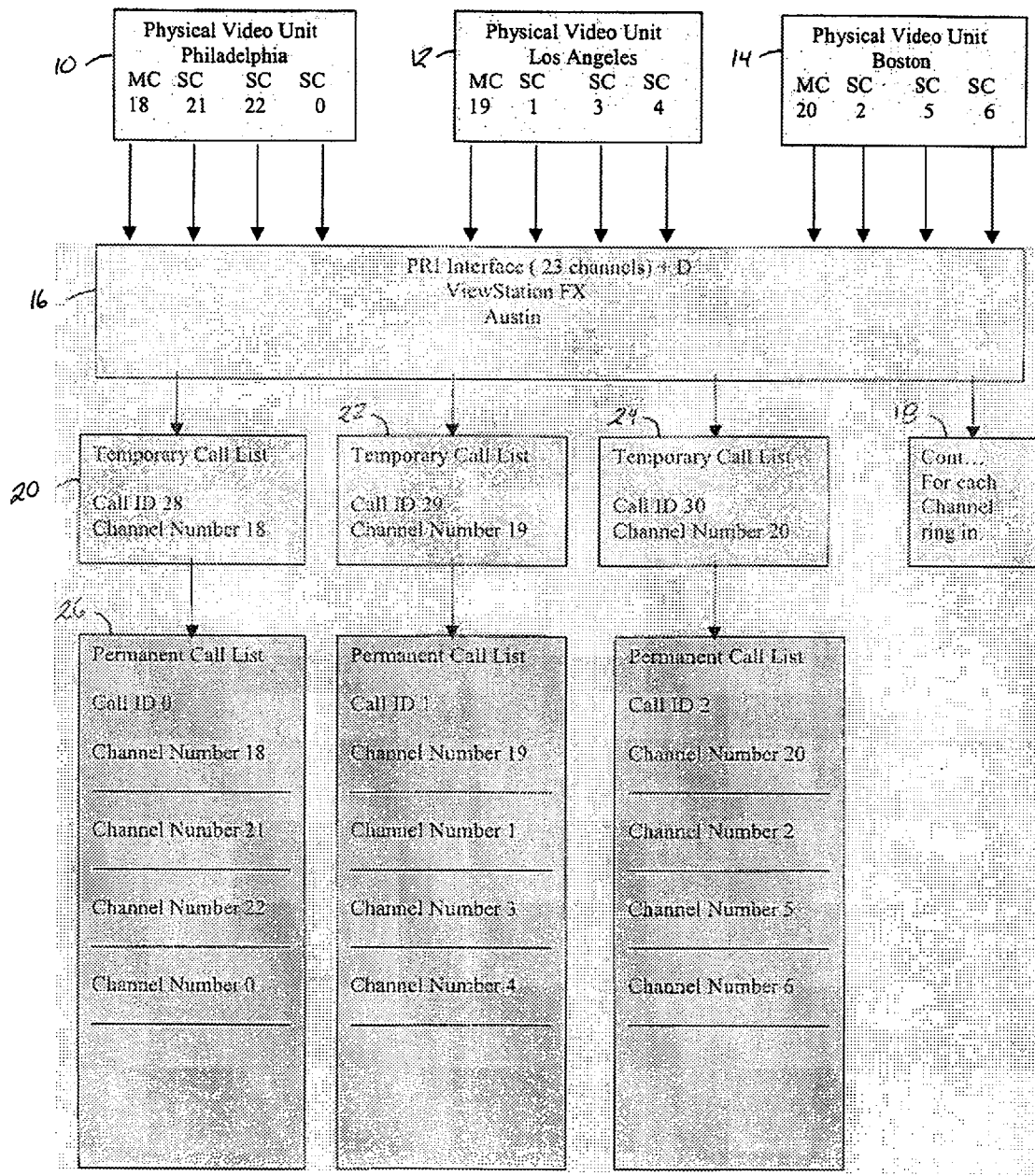
FIG. 1 is a schematic representation of a situation wherein two or three ISDN video calls arrive at the same time to a local Physical Video Unit.

FIG. 1 depicts in schematic form a solution to the problem of two or three ISDN video calls from Physical Video Units 10, 12 and 14 arriving at the same time to a local Physical Video Unit (e.g., a ViewStation® FX videoconferencing unit by Polycom, Inc.). It will be appreciated by those skilled in the art that videoconferencing units may be processor-based systems and the methods disclosed herein may be implemented in the form of programmed instructions stored on or in data recording media in such devices.

In FIG. 1, "MC" denotes a master channel and "SC" a slave channel. The calls that arrive at the local Physical Video Unit arrive on single channels on the ISDN Primary Rate Interface (PRI) 16. The channels may then need to be analyzed to determine the type of video channel, and to which physical video unit the channel for the multi-channel video call is to be assigned. The method of the present invention uses the concept of temporary call identifiers for each channel. Each call, when answered, may be put on a temporary call list, analyzed, and may then be put on the permanent call list whereby the call may then be grouped with the other channels comprising the particular video call and delay compensation may then be calculated. Delay compensation is a method for adding delay to channels that have shorter network delays than other channels. This results in the data being presented to the video conferencing system in the same order is was transmitted from the far side. As indicated by block 18, in alternative embodiments, more video calls are contemplated for use in the present invention.

In the exemplary process shown in FIG. 1, calls arrive from three geographically different locations—Philadelphia, Los Angeles, and Boston—on PRI channels 18, 19, and 20 of a videoconferencing endpoint having an internal MCU located in Austin. Solutions of the prior art that do not handle this event may assume that when one channel rings in, the next number of consecutive channels that ring in are associated with the same physical video unit. This is, of course, is a bad assumption and the problem is avoided by the practice of the present invention.

The calls are answered in the sequential order 18, 19, and 20, and are put into new temporary call lists 20, 22 and 24 to be processed. The bonding task for each new temporary call ID may be started and the state machine may be started with the state indicating to begin searching for Bonding Master Channel framing. A bonding task is an element of a multi-tasking operating system that processes the master channel and its associated slave channels. The process begins and throws away bytes it receives from the Physical Video Unit until the process determines that there are at least two consecutive full Information Channel frames received (see Bonding Specification 1.0 Section 6 of "Interoperability Requirements for Nx56/64 kbits/s Calls" (1992) incorporated herein by reference and published by the Bonding Consortium for the full description and layout of the Information Channel frame).

The process may then retrieve the following fields from the Information Channel message: Transfer Flag (XFLAG), Channel Identifier (CID), the Physical Video Unit Identifier or Group Identifier (GID), the Rate Multiplier (RMULT), and the Bonding Mode (MODE) of operation. The Transfer Flag is a field within the Information Channel Frame occupying octet 9, bits 2 through 7. It may be used for several different purposes and may range in value from 0 through 63. A value of 63 indicates an all Is pattern in the field. The Channel Identifier is a field within the Information Channel Frame occupying octet 2, bits 2 through 7. The Channel Identifier identifies each individual channel in the transmit direction for each side of the connection and may be used to sequence the time slots in proper order at the receiving end. The Channel Identifier may range in value from 0 through 63. The Group Identifier is a field within the Information Channel Frame occupying octet 3, bits 2 through 7. The Group Identifier may be used to uniquely identify the group of bearer channels associated with a particular call. The Group Identifier may range in value from 0 through 63, inclusive. The Rate Multiplier is a field within the Information Channel Frame occupying octet 5, bits 2 through 7. The Rate Multiplier contains information that uniquely defines the application rate for a given call. In essence, it contains the number of individual channels that may participate in a particular Video Call. The Rate Multiplier may range in value from 0 through 63. The Bonding Mode is a field within the Information Channel Frame occupying octet 4, bits 2 through 4. The Bonding Mode indicates what Bonding mode the call is operating in. The Bonding Mode may range in value from 0 through 3 indicating Mode 0, Mode 1, Mode 2, or Mode 3.

If the transfer flag has the value of 63, the channel identifier has the value 0, the group identifier has the value 0, the rate multiplier is equal to any positive value, and the bonding mode is one, then it is determined that this call on this channel is a new call from a specific Physical Video Unit and that this channel may be deemed a Master Bonding Channel. The process may then reset variables and interrupt service vectors for the call, based on the temporary call list contained within. The call progress and the state of the call for this new Master Channel may then be updated. The bonding task for the new permanent call identifier 0 may be started and the channel may be now moved to the permanent call identifier 0 list 26. The bonding task may then begin its state machine for a new call, which may then include performing parameter negotiation with the new Physical Video Unit. Once parameter negotiation is complete, the bonding task may then begin transmitting the bonding multi-frame structure and begin searching for multi-frame alignment per the bonding specification. A bonding frame contains 256 octets with 4 octets used for overhead (octet 64, octet 128, octet 192, octet 256). A bonding multi-frame structure consists of 64 frames numbered 1 through 64. If it was determined by the process that Master Channel synchronization was not being received, the process may keep searching for up to 1 second. After this time, a timeout may be declared and the process may begin looking for bonding slave channel framing as well as H.221 framing.

An exemplary process, which now determines slave framing, begins by configuring its interrupt routines to transmit bonding multi-frame alignment—the identification of the bonding multi-frame on the incoming channel—as well as searching for bonding multi-frame alignment. If multi-frame alignment is found within seven seconds, the process may then search for Information Channel sub-frame synchronization, which is carried within the bonding slave channel multi-frame. Seven seconds is a generous time and is less than the maximum allowable value of 10 seconds for the timers TAFA (Timer Answer Frame Alignment) and TaNULL (Timer Answer beginning state), defined in the Bonding specification, and is a calculated value based on initial delay of network equipment transmitting the framing pattern and has some time built in for errors and retransmissions. The process waits to retrieve the physical video unit identifier field until it has been determined that three Information Channel frames have been received. The Bonding specification specifies a method used to determine new values in the Information Channel as non-instantaneous change. The method for determining a valid change in values may be implementation dependent, but it is preferred that the receiver check several Information Channel Frames in succession before declaring a change in values (i.e., 2 out of 3 majority voting). Test results indicate that this is the optimum number of Information Channel frames to wait to retrieve correct values. At this time the process may retrieve and validate the Physical Video Unit identifier. The process may then remove the channel from its respective temporary call list. The process may then update the call progress status and state of the call, and may then move the newly found slave channel to the proper permanent call list for further processing by the bonding task. Once all of the slave channels are added to the permanent call list of the particular Physical Video Unit and delay equalization has been calculated, the Video Call is ready for audio, video, and data communications. In alternative embodiments, different values may be used for various elements described above including, but not limited to, time and number of channels.

Simultaneous Inbound H.221 Calls

The present invention may employ a mechanism that may be used to support the TIA/TIX method when transitioning from a point-to-point connection to a multipoint connection. This method is used for non-bonded calls using H.221 channel aggregation. An MCU may send a terminal number in the initial channel to an endpoint using the "Terminal Indicate Assignment" (TIA) message. The endpoint may then send the "Terminal Indicate additional-channel-X" (TIX) message in its additional channels so that the MCU may associate them with the initial channel. When an H.320 system is acting exclusively as an endpoint, it may not send a TIA to the far endpoint. As addition channels come into the conference, the H.320 system may associate them with the initial channel without the use of a terminal address.

However, if a second initial channel is detected, the H.320 system may transition into the multipoint mode and become an MCU. At this point, it may assign terminal addresses to both endpoints that are entering a conference. The far endpoints should then immediately begin sending TIX in their additional channels. The H.320 system that is now serving as an MCU may associate any additional incoming channels with the correct initial channel by matching the terminal addresses that are received.

If an H.320 system that is transitioning into becoming an MCU detects that it is connected to another MCU it must begin a master-slave determination with the other MCU. The outcome of the master-slave determination may result in the terminal numbers changing for the endpoints that are connected directly to an H.320 system. The H.320 system may assign terminal numbers that are known only to it and the connecting endpoint so as to avoid conflict with other terminals in the conference that may have the same terminal address. Once the master-slave determination has completed, the H.320 system may re-assign terminal address to remove any potential address conflicts.

If an incoming call is from an MCU, then the H.320 system cannot assign a terminal address until master-slave determination has completed. In this case, it may not be possible to avoid duplication of terminal addresses.

An alternative method assigns a Physical Video Unit Identifier for every incoming initial channel. This ID may then be transmitted by the far endpoint or MCU using a message. Since the H.320 standards do not define such a message, this must be conveyed using the non-standard command message.

This method solves the problems associated with transitioning from an endpoint to an MCU, and also resolves the problems that occur when multiple MCUs call into a system.

Simultaneous H.323 Calls

Figure 2:
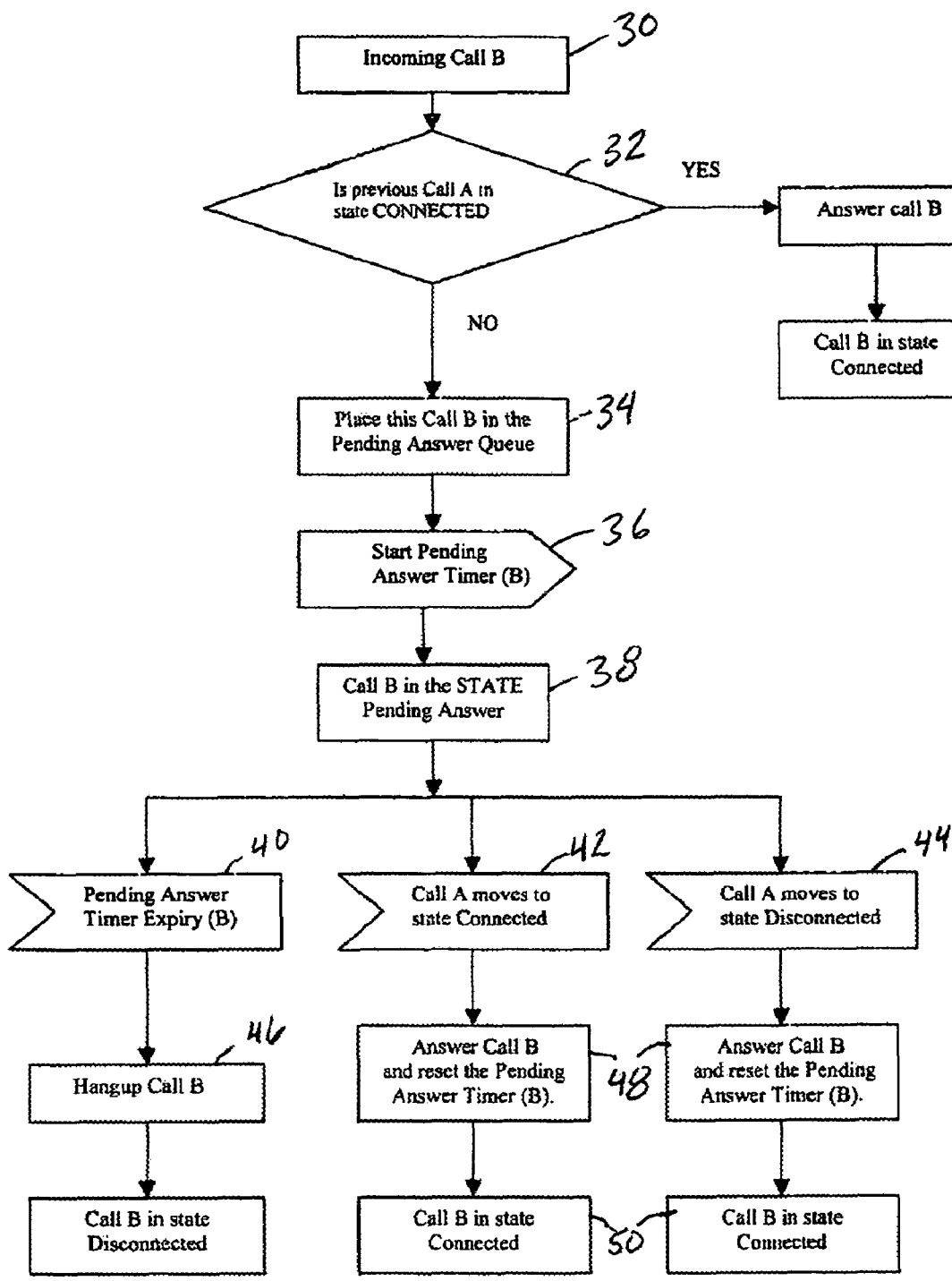
FIG. 2 is a flow chart depicting how one embodiment of the invention handles simultaneous incoming H.323 calls.

As shown in FIG. 2, when an Incoming Call 30 is received, a check 32 may be made to determine if the previous call is in the state Call Connected. If not, this incoming call may be placed in a Pending Answer queue 34, a Pending Answer Timeout may be started 36 for a particular duration and the system may wait with Call B in state PENDING ANSWER 38 for the current call to determine its fate (i.e., either its progress is to state CONNECTED or it is likely to progress to state DISCONNECTED and hang-up). Whenever the Call A reaches this transition (i.e., Connect 42 or Disconnected 44), it may be queried to find if there are any Calls placed in the Pending Answer queue and if so it may be retrieved, the pending Answer timer reset and an attempt made to CONNECT this call 48. On expiration of the Pending Answer timer 40, the Call that was kept in the Pending Answer State may simply be disconnected 46.

The invention has been described above with reference to exemplary embodiments. It will be apparent to those skilled in the art that various modifications may be made and other embodiments may be used without departing from the broader scope of the invention. For example, alternative embodiments may utilized other ITU standards not described above. Furthermore, the above description provided exemplary embodiments illustrating specific numbers of calls. In alternative embodiments, more or fewer calls may be utilized by the present invention. Therefore, these and other variations upon the exemplary embodiments are intended to be covered by the appended claims.

REFERENCES

Incorporated herein by reference are: ITU-T Recommendation H.221; ITU-T Recommendation H.320; ITU-T Recommendation H.323; and, ITU-T Recommendation H.243 of the International Telecommunication Union's Telecommunication Standardization Sector (ITU-T) and Interoperability Requirements for Nx56/64 kbit/s Calls, Bonding Specification Version 1.0, Sep. 1, 1992.

What is claimed is:

1. A method for processing incoming ISDN calls by a videoconferencing station comprising:
    receiving at least two incoming calls that occur within a time interval less than that required to process an incoming ISDN call;
    placing each of the incoming calls in a temporary call list for analysis;
    analyzing each of the incoming calls in the temporary call list to determine video channel type wherein analyzing each of the incoming calls uses a framing listening technique; and
    moving each of the analyzed incoming calls to a permanent call list based on the video channel type of the call.

2. A method as recited in claim 1 wherein the framing listening technique distinguishes between H.221 framing, master bonding channel framing and slave bonding channel framing.

3. A method as recited in claim 1 further comprising transmitting a multi-frame pattern if the video channel type is slave bonding channel framing.

4. A method as recited in claim 3 further comprising determining whether a previously-sent video unit identifier has been returned.

5. A method as recited in claim 1 further comprising addressing as a new call an incoming call that is transmitting master bonding channel framing.

6. A method as recited in claim 1 further comprising:
    grouping an incoming call with other channels comprising a video call; and
    calculating a delay compensation.

7. A method as recited in claim 1 further comprising:
    receiving a value representing a transfer flag;
    receiving a value representing a channel identifier;
    receiving a value representing at least one of a physical video unit identifier and a group identifier;
    receiving a value representing a rate multiplier; and
    receiving a value representing a bonding mode.

8. A processor-based videoconferencing station comprising a data recording media storing instructions for causing the processor to:
- receive at least two incoming ISDN calls that occur within a time interval less than that required to process an incoming ISDN call;
- place each of the incoming calls in a temporary call list for analysis;
- analyze each of the incoming calls in the temporary list to determine video channel type wherein the instructions for anaylzing each of the incoming calls use a framing listening technique; and
- move each of the analyzed incoming calls to a permanent call list based on the video channel type of the call.

9. The station of claim 8, wherein the framing listening technique distinguishes between H. 221 framing, master bonding channel framing and slave bonding channel framing.

10. The station of claim 8, the medium further storing instructions for causing the processor to:
- transmit a multi-frame pattern if the video channel type is slave bonding channel framing.

11. The station of claim 10, the medium further storing instructions for causing the processor to:
- determine whether a previously sent video unit identifier has been returned.

12. A videoconferencing station comprising:
- a receiver for at least two incoming ISDN calls that occur within a time interval less than that required to process an incoming ISDN call;
- a temporary call list for placing at each of the at least two incoming callsfor analysis;
- an analyzer to determine video channel type of each of the incoming calls in the temporary list wherein the analyzer uses a framing listening technique; and
- a permanent call list for each video channel call type of the analyzed incoming calls.

13. The station of claim 12, wherein the framing listening technique distinguishes between H. 221 framing, master bonding channel framing and slave bonding channel framing.

14. The station of claim 12, wherein the analyzer further determines whether a previously sent video unit identifier has been returned.

* * * * *